(12) United States Patent
Wu et al.

(10) Patent No.: US 11,388,145 B2
(45) Date of Patent: Jul. 12, 2022

(54) TUNNELING DATA TRAFFIC AND SIGNALING OVER SECURE ETLS OVER WIRELESS LOCAL AREA NETWORKS

(71) Applicant: TELEFONAKTIEBOLAGET LM ERICSSON (PUBL), Stockholm (SE)

(72) Inventors: Changzheng Wu, Shenzhen (CN); Huawei Qin, Shenzhen (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 254 days.

(21) Appl. No.: 16/332,512

(22) PCT Filed: Sep. 12, 2016

(86) PCT No.: PCT/CN2016/098737
§ 371 (c)(1),
(2) Date: Mar. 12, 2019

(87) PCT Pub. No.: WO2018/045590
PCT Pub. Date: Mar. 15, 2018

(65) Prior Publication Data
US 2019/0268767 A1   Aug. 29, 2019

(51) Int. Cl.
*H04L 29/06* (2006.01)
*H04L 29/08* (2006.01)
(Continued)

(52) U.S. Cl.
CPC ........ *H04L 63/0272* (2013.01); *H04L 63/029* (2013.01); *H04L 63/0823* (2013.01);
(Continued)

(58) Field of Classification Search
CPC . H04L 63/162; H04L 63/164; H04L 63/0823; H04L 63/166; H04L 63/029;
(Continued)

(56) References Cited

U.S. PATENT DOCUMENTS 8,184,530 B1 * 5/2012 Swan ............... H04W 76/12
370/230
8,850,182 B1 * 9/2014 Fritz ............... H04L 63/30
713/150
(Continued)

FOREIGN PATENT DOCUMENTS

CN    101562814 A    10/2009
CN    101715190 A    5/2010

OTHER PUBLICATIONS

Extended European Search Report issued in corresponding EP Application No. 16915524.9 dated Feb. 25, 2020, 06 Pages.
(Continued)

*Primary Examiner* — Haresh N Patel
(74) *Attorney, Agent, or Firm* — Sage Patent Group

(57) ABSTRACT

This specification presents a method and apparatus to establish a transport layer security, TLS, tunnel over Ethernet, ETLS tunnel between two endpoints (UE and WAG) and to transport UE traffic encapsulated and encrypted in a proposed TLS type Ethernet frame for all applications, thus providing secure layer 2 connectivity over public wireless local area networks, WLAN, for all UE traffic and overcome the security vulnerability of the traditional HTTP login mechanism over the public WLAN. The UE uses the TLS handshake protocol which may include negotiating ETLS capabilities extension that comprises wireless control protocol for establishing a packet data connection and tunneled authentication protocol for UE authentication and full Ethernet protection for encrypting Ethernet frames of different types.

27 Claims, 6 Drawing Sheets

(51) Int. Cl.
  *H04L 29/12* (2006.01)
  *H04L 9/40* (2022.01)
  *H04W 76/12* (2018.01)
  *H04W 12/06* (2021.01)
  *H04W 12/02* (2009.01)
  *H04W 12/033* (2021.01)
  *H04W 84/12* (2009.01)

(52) U.S. Cl.
  CPC .......... *H04L 63/164* (2013.01); *H04L 63/166* (2013.01); *H04W 12/02* (2013.01); *H04W 12/033* (2021.01); *H04W 12/06* (2013.01); *H04W 76/12* (2018.02); *H04W 84/12* (2013.01)

(58) Field of Classification Search
  CPC .............. H04L 63/0272; H04W 12/02; H04W 12/033; H04W 12/06; H04W 76/12; H04W 84/12
  USPC ............................................................ 726/6
  See application file for complete search history.

(56) References Cited

U.S. PATENT DOCUMENTS

| | | | | |
|---|---|---|---|---|
| 2004/0022268 | A1* | 2/2004 | Busi | H04L 12/46 370/469 |
| 2004/0093522 | A1* | 5/2004 | Bruestle | H04W 12/50 726/16 |
| 2007/0189249 | A1* | 8/2007 | Gurevich | H04L 45/26 370/338 |
| 2007/0277236 | A1* | 11/2007 | Yang | H04L 41/12 726/15 |
| 2008/0104401 | A1* | 5/2008 | Miyamoto | H04L 9/3268 713/175 |
| 2008/0273706 | A1* | 11/2008 | Noll | H04L 63/06 380/279 |
| 2008/0310366 | A1 | 12/2008 | Oba et al. | |
| 2009/0119742 | A1* | 5/2009 | Graziani | H04L 63/08 726/1 |
| 2009/0259755 | A1* | 10/2009 | Boucachard | H04L 12/4633 709/227 |
| 2009/0289757 | A1* | 11/2009 | Ballard | H04L 69/18 340/3.1 |
| 2010/0008365 | A1* | 1/2010 | Porat | H04L 12/4612 370/392 |
| 2010/0161959 | A1* | 6/2010 | Sood | H04W 12/03 713/151 |
| 2011/0060974 | A1* | 3/2011 | Viger | H04L 1/0057 714/800 |
| 2011/0078793 | A1* | 3/2011 | Orgill | H04L 63/1466 726/23 |
| 2011/0141904 | A1* | 6/2011 | Viger | H04L 69/16 370/241 |
| 2012/0087356 | A1 | 4/2012 | Wentink | |
| 2013/0176897 | A1* | 7/2013 | Wang | H04L 12/06 370/254 |
| 2013/0201889 | A1* | 8/2013 | Hong | H04W 52/0209 370/311 |
| 2013/0297814 | A1* | 11/2013 | Annamalaisami | H04L 69/26 709/230 |
| 2015/0113264 | A1* | 4/2015 | Wang | H04L 63/02 713/151 |
| 2015/0149635 | A1* | 5/2015 | Rajagopalan | G06F 9/52 709/226 |
| 2015/0150115 | A1* | 5/2015 | Le Rouzic | H04L 65/1016 726/14 |
| 2015/0186657 | A1* | 7/2015 | Nakhjiri | H04L 9/0894 713/155 |
| 2016/0119374 | A1* | 4/2016 | Williams | H04L 63/166 713/175 |
| 2016/0261559 | A1* | 9/2016 | Herrero | H04L 67/42 |
| 2017/0078328 | A1* | 3/2017 | McGinnity | H04L 63/04 |
| 2018/0176230 | A1* | 6/2018 | Wei | H04L 29/06 |
| 2019/0074982 | A1* | 3/2019 | Hughes | H04L 9/0863 |

OTHER PUBLICATIONS

PCT International Search Report and Written Opinion dated Jun. 15, 2017 for International Application PCT/CN2016/098737, 7 pages.

\* cited by examiner

TLS type Ethernet frame format
(IP type payload only in data field)

TLS type Ethernet frame format
(Ethernet type payload in Data field)

TUNNELING DATA TRAFFIC AND SIGNALING OVER SECURE ETLS OVER WIRELESS LOCAL AREA NETWORKS

TECHNICAL FIELD

This disclosure relates generally to security in public wireless local area networks.

BACKGROUND

Public Wireless Local Area Network, WLAN, access provides a point to point layer 2, P2P L2, link between a device such a user equipment, UE, and a WLAN access gateway, WAG, or a Software Defined Network, SDN, controller/switch in the cloud over an access point, AP. The WAG is located either in the public WLAN or at the edge of an operator packet core network. The device/UE connects to the AP over a Wireless Fidelity, WiFi, link and the AP typically connects to the WAG using Ethernet and bridge technologies such as Virtual Local Area Network, VLAN, or tunneling technologies such as Ethernet-over-Generic Routing Encapsulation, GRE. The P2P connection is thus a logical connection over the WiFi link and the AP-WAG Ethernet connection. The AP transport the Ethernet frames received from the device/UE to the WAG/SDN controller (or switch) over the P2P connection by mapping between the Institute of Electrical and Electronics Engineers, IEEE 802.11 (Medium Access Control, MAC) frames in the data link layer of the WiFi link and the IEEE 802.3 Ethernet frames in the Data Link layer ("on the wire") of the Ethernet connection towards the WAG or SDN controller/switch. All traffic including for example Dynamic Host Control protocol, DHCP, messages, Extensible Authentication Protocol, EAP, messages, application payload that is transmitted to/from the UE are carried on the P2P L2 link between the UE and the TWAG.

As all traffic from the device/UE is transported over the P2P L2 Link to the WAG/SDN controller (or switch), the WAG/SDN controller (or switch) may provide control and management of the device/UE traffic such as service chaining and/or Network Address Translation, NAT, before forwarding the traffic to the Internet or enterprise network or other packet data networks.

The Trusted WLAN, TWAN, access specified in Third Generation Partnership Project, 3GPP, Technical Specification, TS, 23.402 includes a collection of WLAN APs and a Trusted WLAN Access Gateway, TWAG, that connects to the UE over the P2P L2 link and provides the UE access to the operator's evolved packet core network, EPC, over the well-known 3GPP S2a interface (a layer 3 IP tunnel) to a packet data gateway, PGW, in the EPC. The PGW provides access to the operator's services (e.g., service chaining, intranet, etc.) and access to packet data networks, PDNs. When the UE is not authorized to connect to the EPC resources or services or does not request connection to the EPC resources, the TWAG may also offer local offloading of the UE traffic directly to the Internet, in which case there are no PDN connections established for the UE.

As indicated, the UE may connect to the operator's EPC via a PDN connection established over the P2P L2 link (UE-TWAG) and the S2a interface (TWAG-PGW) or may connect over the P2P L2 link directly to Internet from the TWAG bypassing the EPC resources. The 3GPP TS 23.402 specifies three access connection modes to allow the UE to connect to the EPC and directly to the internet. The three access connection modes consist of Transparent Single-Connection mode, TSCM, single-connection mode, SCM, and Multi-connection mode, MCM. Each access connection mode supports either traffic local break out (also referred to as direct access to the Internet or non-seamless WLAN offloading, NSWO) and/or EPC routed traffic over a PDN connection.

In TSCM or SCM mode, there is no explicit signaling between the UE and TWAG to establish the PDN connection over the S2a interface. The S2a tunnel between the TWAG and the PGW is setup statically or dynamically by the TWAG without any explicit PDN connection signaling from the UE. The association in the TWAN between UE-TWAG P2P L2 link and S2a tunnel is based on the UE MAC address. However, in MCM, a dedicated signaling protocol between the UE and the TWAG, referred to as Wireless local control protocol, WLCP, is used to setup one or more PDN connections to EPC network.

In order to support access to EPC resources and services over PDN connection established over the P2P L2 link in TWAN and the S2a interface, the UE and the TWAN as specified in 3GPP TS 23.402 must support IEEE 802.1x authentication. However, many public WLAN access networks that are widely deployed do not comply to 3GPP TS 23.402 requirements and are not using IEEE 802.1x authentication. In fact, in most public WLAN access, access authentication is performed once the UE attempts to access the Internet. Instead of allowing the user traffic to go to the internet, it is instead redirected to a web portal that authenticates the user via a user/password login mechanism. Authentication with the web portal is performed using a standard secure Hypertext transfer protocol, HTTPS, connection which is an HTTP over Transport Layer Security, TLS, protocol specified in Internet Engineering Task Force, IETF, Request for Comment, RFC 5246. The TLS protocol enables the device/UE to authenticate the TLS server (in the web portal) which is based on a server certificate and exchange cryptographic parameters that will enable encryption of the HTTP payload exchanged with the web portal. Using HTTPS connection, the login data (username and password) sent by the user over the P2P link is encrypted by the TLS protocol at the TCP/IP layer and thus protected against eavesdropping. Once the login process has completed, all the Ethernet frames carrying IP traffic from the UE to the Internet over the P2P L2 link will be exposed to security attacks as there is no link layer encryption in the public WLAN and any encryption may be provided by the application (e.g., if UE accesses a secure web site over public WLAN via HTTPS). Consequently, many users are risking the security of their personal information or digital identity when inadvertently accessing unsecure sites as users' WiFi connection may be highjacked by malicious users. This lack of blanket protection of all UE traffic over the TWAN could lead to substantial monetary losses or identity theft. In addition, although IEEE 802.1x specifies a mechanism to secure the communication over the wireless link, it is not widely available in public WLAN.

SUMMARY

It is an object of the present invention to obviate or mitigate at least one disadvantage of the prior art and to provide a secure point-to-point, P2P L2 link over the public wireless local area network, WLAN, before the user starts sending and receiving any payload to/from either the Internet or to/from the operator's packet core network. The secure P2P L2 connectivity is provided by Transport Layer Security, TLS, running natively over Ethernet and where payload related to signaling and data is encrypted and transported in a proposed TLS type Ethernet frame. The data encrypted in the TLS type Ethernet frame may be native IP payload or other different Ethernet frames. The signaling encrypted by the TLS type Ethernet include TLS handshake finish, Alert, heartbeat and may include tunneled authentication protocol negotiated during the TLS handshake phase of the TLS protocol and wireless local control protocol, WLCP, for establishment and release of packet data connections, PDN, to the operator's packet core network.

Embodiments describing user equipment, UE, apparatus and method executed at the UE relating to establishment and management of a TLS tunnel over the P2P L2 link to provide encrypted link layer over the public WLAN are disclosed. The TLS tunnel over the P2P L2 link is herein referred to as secure ETLS or ETLS. In one embodiment, a method for establishing a secure link over WLAN where the method is executed at a user equipment, UE, which comprises the step of sending a TLS type Ethernet frame carrying a TLS client Hello message over a link layer connection for establishment of a secure TLS tunnel over Ethernet, ETLS, between the UE and a receiver of the TLS type Ethernet frame where the receiver is preferably a wireless access gateway. The client hello message may be triggered by reception of either a TLS type Ethernet frame carrying a server hello request message from the receiver, or reception from upper protocol layers of the UE, data to send over the P2P L2 link, such as DHCP protocol messages. Subsequent to the UE obtaining from the receiver a TLS server Hello message encapsulated in the TLS type Ethernet frame, the UE establishes the secure ETLS between the UE and the receiver in accordance with TLS handshake messages encapsulated in the TLS type Ethernet frame and where the TLS handshake messages are based on specified TLS protocol. Once the secure ETLS, simply referred to as ETLS in this specification, is established, the UE executes the step of tunneling selected data traffic and signaling over the secure ETLS wherein the selected data traffic is encrypted and encapsulated in a data TLS type Ethernet frame. The data TLS type Ethernet frame is a TLS type Ethernet frame that carries encrypted payload. As there are only few TLS handshake messages used at initial exchange of the ETLS establishment that are unencrypted, and that the remaining traffic data/signaling is sent encrypted in TLS type Ethernet frames, this specification will also refer to the data TLS type Ethernet frame as TLS type Ethernet frame carrying encrypted payload. The selected data traffic and signaling may be all IP traffic transported as natively and encrypted in a TLS type Ethernet frame. Alternatively, the selected data traffic and signaling encrypted within the TLS type Ethernet frame may correspond to other Ethernet frames different from TLS type Ethernet frames.

In one embodiment, the method further comprises the UE and the receiver negotiating ETLS capabilities extension and wherein the ETLS capabilities extension indicates one or more type of the selected data traffic to encapsulate within the TLS type Ethernet frame. In one embodiment, the ETLS capabilities extension indicates encapsulating within the TLS type Ethernet frame one or more Ethernet frame of a different type. In another embodiment, the ETLS capabilities extension further indicates support for tunneling an authentication protocol for authenticating access for the UE to a packet core network over the established secure ETLS.

In one embodiment, the authentication protocol tunneled over the ETLS corresponds to an Extended authentication protocol, EAP. In another embodiment, the ETLS capabilities extension further indicates support for tunneling WLAN access control protocol, WLCP, over the established secure ETLS and wherein the WLCP is used to manage establishment and release of packet data connection by the UE to the packet core network over the established secure ETLS.

In one embodiment, initiation of the WLCP is conditional to successful outcome of authenticating access for the UE to the packet core network in accordance with the authentication protocol.

In one embodiment, the method further comprises the UE sending a TLS Alert message to indicate release of the secure ETLS by the UE. In another embodiment, the method further comprises receiving by the UE from the receiver (WAG) a TLS Alert message to indicate access authentication failure by the UE and in one embodiment the method in the UE further comprises sending by the UE a TLS Alert message to indicate detach of the UE from the packet core network. The TLS Alert message may include appropriate reason values.

Some embodiments describe a device (i.e., UE) where the device comprises a processor and a memory, where the memory contains instructions executable by the processor whereby the device is operative to send a TLS type Ethernet frame carrying a TLS client Hello message over a link layer connection for establishment of a secure ETLS between the device and a receiver (e.g., WAG) of the TLS type Ethernet frame. When the device receives from the receiver a TLS server Hello message encapsulated in the TLS type Ethernet frame, the device establishes the secure ETLS between the device and the receiver in accordance with the TLS handshake messages encapsulated in the TLS type Ethernet frame. Once the secure ETLS is established, the device tunnels selected data traffic over the secure ETLS wherein the selected data traffic is encrypted and encapsulated in the TLS type Ethernet frame.

BRIEF DESCRIPTION OF THE DRAWINGS

Embodiments of the present invention will now be described, by way of example only, with reference to the attached Figures, wherein.

DETAILED DESCRIPTION

Acronyms and Definitions

Figure 1:
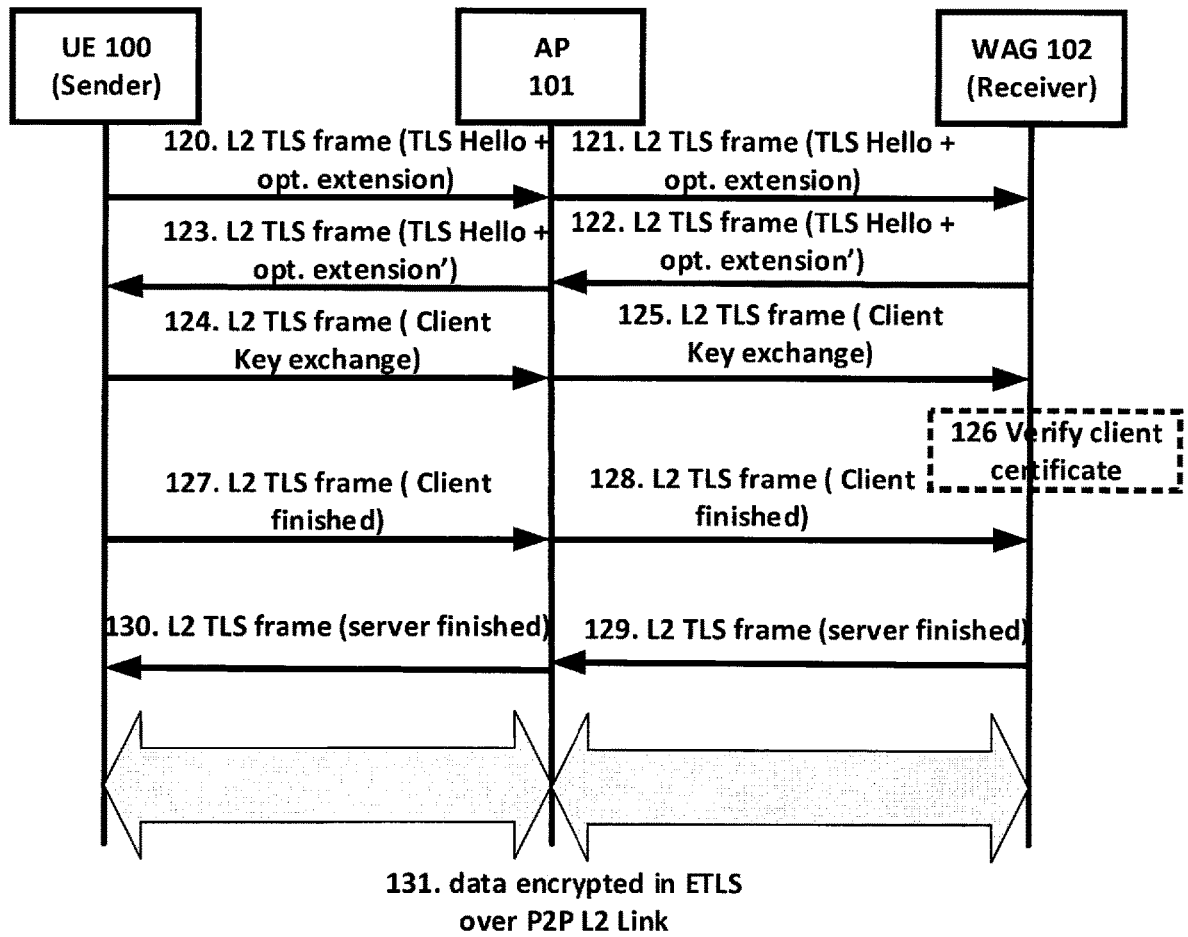
FIG. 1 illustrates a high level sequence diagram for setting up a TLS tunnel over Ethernet between a UE 100 as the sender initiating the establishment of the TLS tunnel over Ethernet and a WAG 102 as the receiver according to an embodiment.

The following acronyms and definitions are used throughout this disclosure.
5G 5$^{th}$ Generation
3GPP 3$^{rd}$ Generation Partnership Project
AAA Authentication Authorization and Accounting AP Access Point
EAP Extensible Authentication Protocol
DTLS Datagram transport layer security
EPC Evolved Packet Core
ETLS TLS over Ethernet
GRE Generic Routing Encapsulation
HTTPS Secure Hypertext transfer protocol
IEEE Institute of Electrical and Electronics Engineers
IETF Internet Engineering Task Force
IMS IP Multimedia Subsystem
IP Internet Protocol
L2 Layer 2
LAN Local Area Network
LTE Long Term Evolution
MAC Medium Access Control
MCM Multiple Connection Mode
NSWO non-seamless WLAN offloading
P2P Point-to-Point
PGW Packet Data Gateway
SCM Single Connection Mode
SDN Software Defined Network
TCP Transport control protocol
TLS Transport Layer Security
TSCM Transparent Single Connection Mode
UDP Unreliable Datagram protocol
UE User Equipment
VLAN Virtual LAN
WAG WLAN Access Gateway
WiFi Wireless Fidelity
WLAN Wireless Local Area Network
WLCP Wireless local control protocol
WiFi L2 link: Link between the UE and the AP and corresponds to the IEEE 802.11 Data Link Layer.
Ethernet link: Link between the AP and the WAG and corresponds to the IEEE 802.3 Data Link Layer.
P2P L2 link: the concatenation of the WiFi L2 link and the Ethernet link at an AP, connecting the UE to the WAG, where the AP provides mapping between IEEE 802.3 Ethernet frames and IEEE 802.11 frames. The P2P L2 link transports TLS type Ethernet frames encapsulated by the MAC layer over the WiFi L2 link and by a VLAN or GRE frame when transmitted over the Ethernet link.
ETLS: TLS tunnel or connection over Ethernet and corresponds to the TLS tunnel established between the UE and the WAG over the P2P L2 link.

Data is encrypted by the TLS record sub-layer associated with the link layer and encapsulated in TLS type Ethernet frames when transmitted between the UE and the WAG, hence providing Layer 2 encryption of data over the public WLAN. In this specification ETLS, ETLS connection, ETLS tunnel are used interchangeably to mean the same thing.

ETLS session: the duration of maintaining the session parameters associated with the ETLS, where the session parameters comprise the session ID for the ETLS and cryptographic information for encrypting the data over ETLS. The ETLS session may be maintained even if ETLS is released. The ETLS may be quickly re-established using the cryptographic information stored in the ETLS session.

The various features of the invention will now be described with reference to the figures. These various aspects are described hereafter in greater detail in connection with exemplary embodiments and examples to facilitate an understanding of the invention, but should not be construed as limited to these embodiments. Rather, these embodiments are provided so that the disclosure will be thorough and complete, and will fully convey the scope of the invention to those skilled in the art.

Many aspects of the invention are described in terms of sequences of actions or functions to be performed by elements of a computer system or other hardware capable of executing programmed instructions. It will be recognized that the various actions could be performed by specialized circuits, by program instructions being executed by one or more processors, or by a combination of both. Moreover, the invention can additionally be considered to be embodied entirely within any form of computer readable carrier or carrier wave containing an appropriate set of computer instructions that would cause a processor to carry out the techniques described herein.

FIG. 1 illustrates a high level sequence diagram for setting up a TLS tunnel over the P2P L2 link, herein referred to as TLS over Ethernet, ETLS, between a UE 100 as the sender initiating the establishment of the ETLS and a WAG 102 as the receiver end-point of the ETLS according to an embodiment. Other embodiment where the WAG 102 is the sender initiating the establishment of the ETLS with the UE 100 will also be described. The tunneling protocol used in the embodiment illustrated in FIG. 1 is based on Transport layer security, TLS, specified in Internet Engineering Task Force, IETF, request for Comment, RFC 5246.

TLS is a client-server protocol widely used in the Internet to provide privacy and data integrity between two communicating computer applications. It is widely used in applications such as web browsing, electronic mail, etc. HTTPS which corresponds to HTTP over TLS is widely used to provide secure login mechanism over the public WLAN (e.g., WLAN login in airport, café, hotel, etc.). However, the HTTPS session used for login is not used to encrypt Internet traffic transmitted over the public WLAN once the login procedure is completed. If the user attempts to access a secure website in the internet over the public WLAN, another TLS session and connection for that application would be established to protect the corresponding application traffic. This is different from the TLS connection/tunnel established in the embodiment of FIG. 1, where the TLS tunnel/connection is established over the link layer, i.e., Ethernet, to encrypt all traffic between the UE 100 and the WAG 102 regardless of the type of application clients in the application layer used by the UE 100.

The TLS protocol is composed of two layers: the TLS Record Protocol and the TLS Handshake Protocol. The TLS Record Protocol is used for encapsulation of various higher level protocols. The Record Protocol takes messages to be transmitted, fragments the data into manageable blocks, optionally compresses the data, applies a message authentication code to authenticate the message, encrypts, and transmits the result. Received data is decrypted, verified, decompressed, reassembled, and then delivered to higher-level clients. Four protocols that use the record protocol are specified in IETF RFC 5246: the handshake protocol, the alert protocol, the change cipher spec protocol, and the application data protocol. An additional TLS protocol that use the record protocol is the Heartbeat protocol specified in IETF RFC 6520. In order to allow extension of the TLS protocol, additional record content types can be supported by the record protocol. Currently the following record content types are known:
20 change_cipher_spec
21 alert
22 handshake
23 application_data
24 Heartbeat This specification describes embodiments for additional record content types for tunneled authentication protocol and wireless local control protocol, WLCP.

The handshake protocol is used by the TLS server and the TLS client to authenticate each other and to negotiate an encryption algorithm and cryptographic keys before the application protocol (e.g., HTTP) transmits or receives its first byte of data. Once the TLS handshake is completed, a TLS tunnel/connection is established and a corresponding TLS session identified by a unique session identifier is created and maintained in both the TLS client and the TLS server. Application data can be transmitted encrypted by the negotiated cryptographic keys. When TLS tunnel/connection is closed, the TLS session may be released or maintained. TLS client may re-create a new TLS session or resume an existing TLS session during TLS tunnel/connection setup.

TLS specified in RFC 5246 requires a reliable transport channel, typically TCP and TLS is established on a per application. When applications require UDP as a transport protocol, Datagram TLS, DTLS, specified IETF RFC 6347 is used instead of TLS. The embodiment in FIG. 1 describes establishment of a TLS connection/session/tunnel at layer 2 level to provide link layer encryption for all traffic between the UE 100 and the WAG 102 following a successful completion of the handshake protocol. The TLS encryption provided for data at the P2P L2 connection is independent of any other TLS encryption that may be used by the upper layer protocols (e.g., HTTPS data). Additionally, the TLS protocol in the embodiment of FIG. 1 does not use TCP or UDP as a transport but the protocol is carried natively over Ethernet.

The embodiment in FIG. 1 is illustrated using a simplified Public WLAN comprising a UE 100, an AP 101 and a WAG 102. The UE 100 may be a smartphone, a tablet, a camera, an Xbox, etc. in other words any user device or consumer device that supports a WiFi interface (e.g., IEEE 802.11 interface) in addition to possibly other cellular interfaces such as LTE or 5G. Any of the devices mentioned above will be referred to herein as a UE 100. The UE 100 connects over the public WLAN using the WiFi interface to access the Internet and/or the user's operator packet core network and services. In the embodiments described in this specification, the UE 100 may obtain or may be configured with a certificate prior to accessing the public WLAN if TLS client authentication is required by the WAG 102 (acting as the TLS server). The certificate may be an International Telegraph Union, ITU, X.509 public key certificate or other certificate provided by a trusted entity.

The AP 101 provides a concatenation of the WiFi L2 link and the Ethernet link to form the P2P L2 link between the UE 100 and the WAG 102. The AP 101 is an AP that receives IEEE 802.11 MAC frames on the Data Link Layer of the WiFi L2 Link from the UE 100 and maps them to IEEE 802.3 Ethernet frames on the Data Link Layer of the Ethernet link towards the WAG 102. In addition, the AP 101 uses a bridge technology such as VLAN or a tunnel technology such as Ethernet over GRE to encapsulate the data units or payload of the 802.11 frames before sending them to the WAG 102 over the 802.3 Ethernet link. Likewise, the data unit received inside a VLAN or GRE or the like from the WAG 102 is retrieved and sent in an 802.11 frame towards the UE 100.

The AP 101 in the embodiment of FIG. 1 receives the TLS type Ethernet frame from the UE 100 as the data unit in an 802.11 MAC frame. the Ethernet type field of the 802.11 MAC frame may indicate presence of the TLS type Ethernet frame as the data unit. As one embodiment, the Ethernet type field of the 802.11 MAC frame may indicate "TLS over Ethernet" or "ETLS" as a new value. The AP 101 retrieves the data unit, i.e., TLS type Ethernet frame, from the 802.11 MAC frame and encapsulates in a VLAN frame or GRE frame and sends it to the WAG 102 over the 802.3 Ethernet link. When VLAN is used as a bridging technology between the AP 101 and the WAG 102, the VLAN header would instead indicate "ETLS" to identify the type of payload or data unit as being the TLS type Ethernet frame carrying TLS traffic. The TLS type Ethernet frame is handled as data units and its content is transparent to the AP 101, unless the WAG 102 is functionally collocated with the AP 101, hence terminating the TLS tunnel/connection.

The WAG 102 is a WLAN access gateway, which may be in the public WLAN or at the edge of the operator's packet core (E.g., EPC). The WAG 102 receives the user data from the AP 101 over the P2P L2 link and either forwards the data directly to the Internet in an NSWO configuration, hence bypassing any operator's packet core network resources, or tunnels the data over an S2a interface towards a gateway (e.g., PGW) in the operator's packet core network if packet core network routing is supported and requested by the UE 100. The WAG 102 could be a TWAG as specified in 3GPP TS 23.402 or any Access gateway that provides for the WLAN users direct access to the Internet or access to the operator's packet core resources and services. The WAG functionality could also be distributed between an SDN controller/switch in a cloud environment. In this specification, WAG 102 is used to describe the embodiments of this invention. In the embodiment described in FIG. 1, the WAG 102 terminates the TLS connection with the UE 100 over the P2P L2 link, retrieves the encapsulated/encrypted data or signalling from the UE 100 for further processing and transmits to the UE 100 encapsulated/encrypted data/signalling to the UE 100.

Additionally, in this specification, EPC is used as the operator's packet core to describe the embodiments. However, it is understood that any operator's packet core network could be used including but not limited to 5G core network, General Packet Radio Service, GPRS, network, virtualized distributed packet core and/or SDN defined core network. In any environment, the packet core network provides a gateway function (PGW in the case of EPC) that supports the S2a interface (or the like) to the WAG 102 in order to provide access to the operator's resources and services. Examples of those services include but are not limited to IP address assignment, service chaining, access to PDNs, Intranet, Internet Protocol multimedia subsystem services, IMS, etc.

FIG. 1 illustrates how TLS tunnel/connection is setup directly over the P2P L2 link, herein referred to as ETLS, between the UE 100 and the WAG 102 through the AP 101 prior to transmitting any data or other signalling over the P2P L2 link. The TLS handshake protocol used to setup the ETLS in the the embodiment of FIG. 1 is based on the handshake messages of IETF RFC 5246. In the embodiment of FIG. 1, ETLS tunnel setup is initiated by the UE 100, acting as the TLS client, using the TLS handshake exchange with the WAG 102. The UE 100 initiates ETLS setup by sending TLS client hello message (or first TLS Hello message) at step 120. The TLS client hello message lists cryptographic information such as the TLS version and, in the client's order of preference, the CipherSuites supported by the UE 100 and may include the data compression methods supported by the TLS client in the UE 100. The TLS client hello message is sent unencrypted over the WiFi L2 link and inside a TLS type Ethernet frame identified with content type "handshake". The TLS client hello may be triggered by data received from the upper protocol layers in the UE 100 such as DHCP messages to be sent to the WAG 102. Moreover, the TLS client Hello message may include optional extensions to enable the UE 100 to negotiate ETLS capabilities with the WAG 102. The ETLS capabilities indicate the type of traffic to encrypt with the established TLS encryption keys for transmission over the ETLS tunnel. The negotiated ETLS capabilities comprise:

Full Ethernet protection
TLS Tunneled authentication support
Wireless Local Control Protocol, WLCP, support Full Ethernet protection: indicates that all payload between the UE 100 and the WAG 102 is to be encapsulated in the TLS application_data sub-layer specified in RFC IETF 5246. By default, TLS type Ethernet frame may replace the existing IP type Ethernet frame and upper IP payload of IP type Ethernet frame is instead encapsulated in TLS and included in a TLS type Ethernet frame before transmission over the P2P L2 link. Additionally, Full Ethernet protection may include encapsulating (hence encrypting) in TLS all other Ethernet frames other than IP type Ethernet frames. A corresponding Ethernet type (2 bytes) is added by the UE 100 to the TLS frame (following the TLS header) so that the WAG 102 can restore the original Ethernet frame. FIG. 4 illustrates two embodiments of TLS type Ethernet frames.

Figure 6:
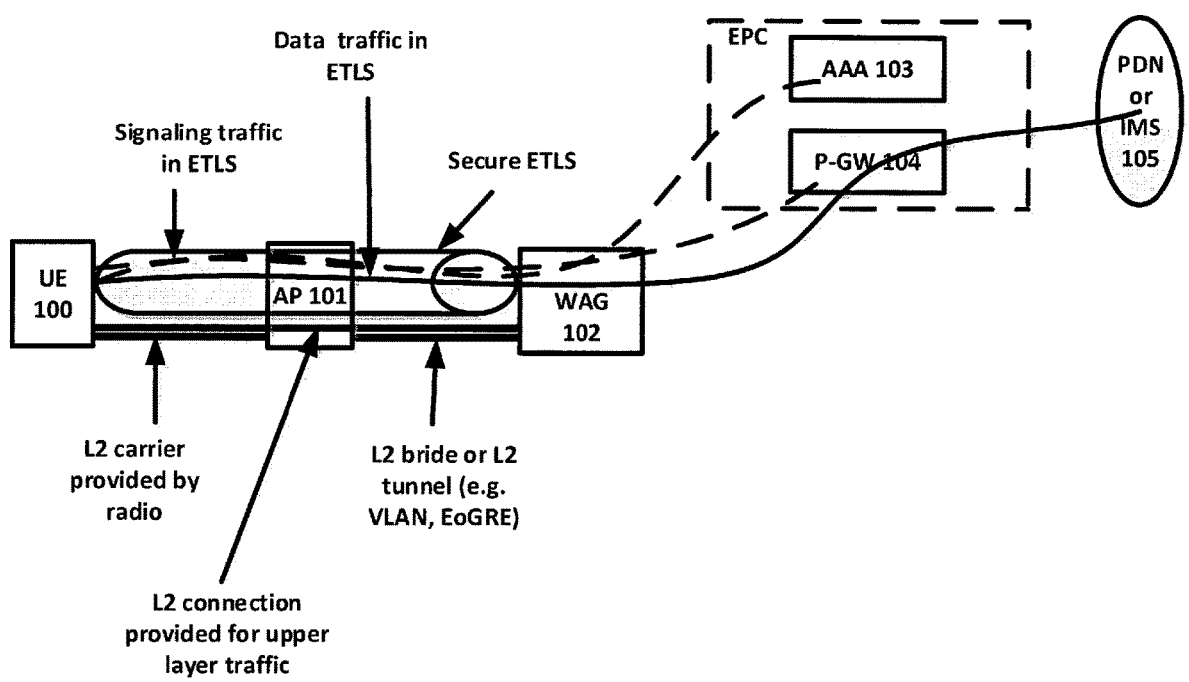
FIG. 6 illustrates Evolved Packet Core, EPC, routing of traffic using ETLS according to an embodiment.

TLS Tunneled authentication: indicates that tunneled authentication is used. This capability may be used when the client (UE) has not been issued a certificate and hence client certificate authentication has not been performed during ETLS setup in which case only one-way authentication of the TLS server by the TLS client has been performed during the TLS handshake. If tunneled authentication is negotiated as part of the ETLS capabilities extension, the tunneled authentication procedure that provides UE or mutual authentication is executed over the established ETLS where tunneled authentication messages are sent as encrypted payload in TLS type Ethernet frame. A new TLS content type is defined to identify that the encrypted TLS payload corresponds to tunneled authentication to enable the WAG 102 to quickly identify the content and authenticate the UE 100 with the AAA server 103 as illustrated in FIG. 6. The AAA server 103 will provide the result of the authentication and the authorization to the WAG 102 which then transmits the result to the UE 100. The UE 100 additionally receives the authorized IP connectivity indicating whether the UE 100 is allowed to connect to the operator's EPC and/or whether the UE 100 is allowed to connect locally to the internet as in non-seamless WLAN offloading, NSWO connection specified in 3GPP 23.402. With NSWO connectivity, the UE 100 is connected through the WAG 102 directly to the Internet bypassing the EPC resources and services.

When tunneled authentication is included by the UE 100 in the ETLS capabilities extension in the client hello message, the extension may also include a list of preferred authentication protocol and methods supported by the UE 100. The WAG 102 may indicate the selected tunnel authentication protocol and method in the ETLS capabilities extension included in the server hello message. Examples of tunneled authentication protocol and methods include albeit not limited to for example tunneling EAP-AKA', where EAP-AKA' is specified in IETF RFC 5448. Alternatively, subsequent to ETLS establishment, authentication information may be tunneled between the UE 100 and the WAG 102 through the use of encrypted attribute-value pairs, AVPs, similar to the AVPs described in EAP-Tunneled TLS specified in IETF RFC 5281.

WLCP support: indicates if WLCP procedure specified in 3GPP TS 24.244 should be performed over the established ETLS to establish and release one or more PDN connection between the UE 100 and a PGW 104 in the EPC as shown in FIG. 6. WLCP procedure over ETLS is conditional to a successful UE authentication which may be provided by either a successful execution of tunneled authentication over ETLS as negotiated during the handshake protocol or if client certificate authentication was successfully performed during the handshake phase and if it is deemed sufficient by the operator's EPC network. A new TLS content type is defined to identify WLCP signalling as encrypted payload in the TLS type Ethernet frame. Clear identification of the WLCP messages in the TLS type Ethernet frame would enable the WAG 102 and the UE 100 to quickly identify the WLCP signalling, process the signalling messages and respond to the WLCP signalling messages. Once the PDN connection is established, the user data transported over the PDN connection is encrypted by the TLS record layer. The TLS type Ethernet frame may identify the encrypted payload transported over the PDN connection as application_data content type in the TLS header. Note that unlike WLCP specified in 3GPP TS 24.244 that requires UDP/IP protocol, the WLCP supported over ETLS is transported natively and encrypted in a layer 2 TLS type Ethernet frame which does not require instantiating an IP/UDP protocol.

The AP 101 in FIG. 1 receives over the WiFi L2 link, an 802.11 MAC frame containing the TLS type Ethernet frame that contains the TLS client hello message. The AP 101 re-encapsulates the TLS type Ethernet frame in a VLAN frame or GRE frame and sends it to the WAG 102 at step 121 over the Ethernet link. As previously indicated, the AP 101 is transparent to the content of the TLS type Ethernet frame content and does not process it. When the WAG 102 receives the TLS client hello message, the WAG 102 acts as a TLS server and responds to the UE 100 with a TLS server hello message (also referred to as receiver TLS hello message) at step 122. The TLS server hello message includes the Cipher-Suite chosen by the server from the list provided by the TLS client at step 120, the session ID. The WAG 102 also sends its digital certificate. If the server requires a digital certificate for client authentication, the server sends a "client certificate request" that includes a list of the types of certificates supported and the Distinguished Names of acceptable Certification Authorities (CAs). If the TLS Client hello message at step 120 includes ETLS capabilities indicating one or more of the capabilities described above, the WAG 102 will include in the TLS server hello message the supported and selected ETLS capabilities for the ETLS. The TLS server hello message is encapsulated but unencrypted in a TLS type Ethernet frame with content type "handshake" and transmitted to the UE 100 on the P2P L2 link over the Ethernet link connecting the WAG 102 to the AP 101 using either GRE or VLAN encapsulation or the like. The AP 101 receives over the Ethernet link, the TLS type Ethernet frame containing the TLS server hello message. The AP 101 re-encapsulates the TLS type Ethernet frame in an 802.11 frame and sends it to the UE 100 at step 123 over the WiFi L2 link.

As indicated, the server hello message sent by the WAG 102 to the UE 100 may include one or more of the proposed ETLS capabilities by the UE 100 in client hello message indicating the selected ETLS capabilities. Alternatively, the WAG 102 may include one or more ETLS capability that may not have been included by the UE 100 in the client hello message. This may be used if the WAG operator would like to control the UE connectivity on the fly and the operator is aware of the UE capabilities. For example, if the client hello does not include the tunneled authentication ETLS capability, the WAG may include the tunneled authentication ETLS capability in the server hello to indicate to the UE 100 that it should authenticate with the network via tunneled authentication. The ETLS capabilities extension may include all the supported tunnel authentication protocols or methods. If the UE 100 fails to authenticate, the WAG may disconnect the ETLS. Alternatively, if the UE 100 does not negotiate the WLCP capabilities in the client hello, the WAG 102 may include WLCP capability in the server hello to request the UE 100 to connect to the EPC network and force the UE traffic to the EPC network.

Subsequent to the exchange of the TLS client hello and server hello messages in FIG. 1, the UE 100 verifies the WAG 102 certificate and checks cryptographic parameters and at step 124 the UE 100 may send client key exchange message which contains key information encrypted with the server public key. If the WAG 102 had requested the client certificate, the client sends a random byte string encrypted with the TLS client's private key, together with the TLS client's digital certificate, or a "no digital certificate alert" if the UE 100 is not configured with a certificate or cannot obtain a certificate. The client key exchange message is also sent in a TLS type Ethernet frame over the P2P L2 link. The AP 101 performs the similar mapping operation and sends the TLS type Ethernet frame containing the client key exchange message to the WAG 102 at step 125. At step 126, The WAG 102 verifies the received client certificate if previously requested at step 122. If "no digital certificate alert" is received, the WAG 102 may proceed with establishment of the TLS connection if the UE 100 indicated support for tunneled authentication in the ETLS capabilities extension in the client hello message at step 120. Alternatively, the WAG 102 may still allow the UE 100 to setup the TLS connection without client authentication or if the WAG 102 is configured to abort the ETLS setup procedure, it may send an encapsulated TLS alert message over the P2P L2 link towards the UE 100 to indicate failed setup of ETLS.

At step 127, the UE 100 sends a TLS type Ethernet frame containing a client "finished" message, which is encrypted with the secret key, indicating that the UE 100 or client part of the handshake is complete. The AP 101 extracts and forwards at step 128 the TLS type Ethernet frame containing the encrypted client finished message over the 802.3 interface to the WAG 102. At step 129, the WAG 102 sends to the UE 100 a server "finished" message, which is encrypted with the secret key, indicating that the WAG 102 part of the handshake is complete. The encrypted server "finished" message is encapsulated in a TLS type Ethernet frame and sent over VLAN or GRE over the Ethernet link to the AP 101. The AP 101 extracts and sends at step 131 the TLS type Ethernet type frame over the WiFi L2 link to the UE 100. The ETLS is now established. For the duration of the TLS session established over the P2P L2 link (i.e., for the duration of the ETLS), the UE 100 and the WAG 102 can exchange messages and data that are symmetrically encrypted with the shared secret key in data TLS type Ethernet frames, i.e., TLS type Ethernet frames with encrypted payload). In addition to the TLS signaling (e.g., Alert, Heartbeat) that are sent encrypted over the ETLS, the type of signaling and data to be encrypted over the ETLS may be negotiated by the ETLS capabilities as explained above, i.e.: Tunnel authentication and WLCP. For data encapsulation within ETLS, all IP traffic is encrypted natively by TLS and transported as the TLS content, or if Full Ethernet protection is negotiated, it may encrypt other Ethernet frames other than TLS type frames as content of the TLS frame. In the absence of ETLS capabilities negotiation, the default behavior is to encapsulate within ETLS all IP payload, i.e., payload previously transported in an IP type Ethernet frames.

In an alternative embodiment, the ETLS setup may be initiated by the WAG 102 instead of the UE 100. The WAG 102 may trigger the ETLS setup by sending a TLS type Ethernet frame carrying a TLS handshake hello request message. Once the ETLS capable UE 100 receives that TLS type Ethernet frame containing the hello request from the WAG 102, it may immediately initiate ETLS setup with the WAG 102 by sending a TLS type Ethernet frame carrying the TLS client hello message and all the steps described in FIG. 1 apply. Alternatively, If the WAG 102 does not know if a new UE 100 has already associated with the AP 101, the WAG 102 may wait until it receives an ordinary Ethernet frame from the AP 101 for the new MAC address of the UE 100 before it sends to the UE 100 a hello request message encapsulated in a TLS type Ethernet frame to request establishment of an ETLS. Only UEs that are capable of parsing and extracting the hello request encapsulated in the TLS type frame would respond with a TLS client hello to establish the ETLS. If the UE 100 does not understand the TLS type frame and is unable to parse the frame to extract the message, the ETLS will not be setup.

Figure 2:
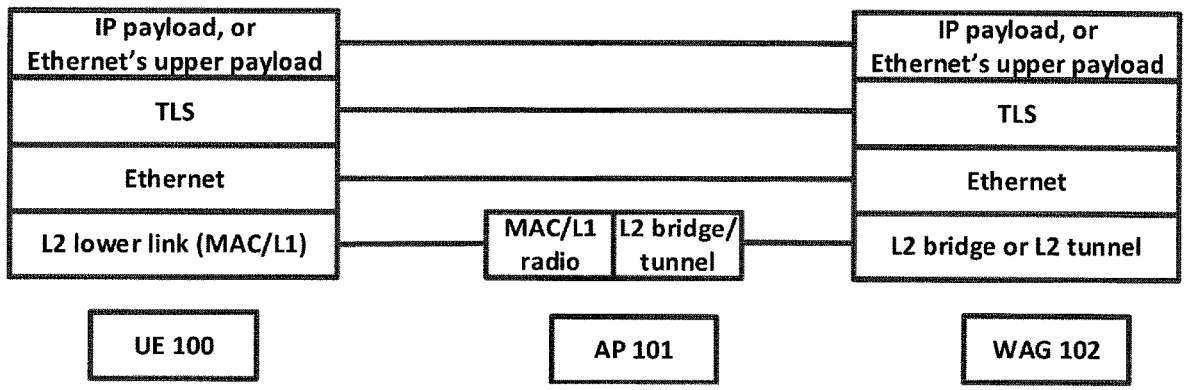
FIG. 2 illustrates the protocol stack architecture at the UE and the WAG as sender and receiver over the AP according to an embodiment.

FIG. 2 illustrates the protocol stack architecture of the UE 100 and the WAG 102 over a bridged AP according to an embodiment. In the UE 100 and the WAG 102, the TLS layer encrypts IP payload that would otherwise, in the absence of the TLS layer, would be carried by an IP type Ethernet frame as in current deployments. Alternatively, the TLS layer may encrypt the IP type Ethernet frame carrying the IP payload. Additionally, the TLS layer may encrypt other Ethernet frames that are neither TLS type Ethernet frame nor IP type Ethernet frames. Note that TLS type Ethernet frames carrying handshake hello messages are not encrypted. Other TLS signalling messages (e.g., Finished, Alert, Heartbeat) are encrypted as per IETF RFC 5246. Additionally, if WLCP and tunnel authentication are negotiated during the handshake Hello exchange, the corresponding messages are transported encrypted within TLS type Ethernet frames.

FIG. 2 illustrates that the UE 100 handles the TLS frame as a data unit encapsulated by an Ethernet header. The Ethernet header identifies the data unit as "ETLS" indicating that the data unit is a TLS frame carried over Ethernet, hence referred to as TLS type Ethernet frame. This is to distinguish from current TLS implementation that require a transport layer protocol such as TCP or UDP and IP. The TLS type Ethernet frame consisting of the TLS frame encapsulated by an Ethernet header is sent as an 802.11 MAC frame over the WiFi L2 connection to the AP 100. The AP 100 receives the 802.11 MAC frame, recovers the original Ethernet frame, which is the TLS type Ethernet frame and re-encapsulates it in VLAN or GRE tunnel or the like. It is understood that the AP 101 may use different known mechanisms to bridge or tunnel the TLS type Ethernet frame from the WiFi L2 link to the Ethernet link and vice versa as long as the AP 101 maintains the TLS frame "on the wire" i.e., transports it as an Ethernet frame since it is a TLS type Ethernet frame.

The WAG 102 according to FIG. 2, receives the TLS type Ethernet frame from the Ethernet link. Since the WAG 102 is also the TLS server, it uses the TLS content type to determine the content of the TLS frame (handshake, application_data, tunneled protocol, WLCP, etc.) and based on the content type, it may decrypt the content in accordance with the cryptographic parameters negotiated at the ETLS handshake. Once the content is decrypted (to the exception of client Hello), the WAG 102 processes the content accordingly. Examples of TLS content processing done at the WAG 102 include:

1. If content is IP traffic/packets, forwarding to the next hop based on IP address of the IP packets or the like (note that IP traffic may include TLS over TCP/IP traffic if the UE 100 attempts to access a secure web site via the public WLAN, in which case, according to embodiments of this specification, the public WLAN used by the UE 100 would independently provide an extra layer of security using the TLS based link layer encryption that encrypts all UE traffic).
2. Authentication of the UE 100 if content corresponds to tunneled authentication.
3. Establishing the ETLS if content correspond to handshake protocol.
4. Establishing a PDN connection if content corresponds to WLCP messages.
5. Managing the ETLS and the ETLS session if content correspond to TLS Heartbeat or TLS Alert.
6. If content correspond to another Ethernet frame determine the next forwarding node or if WAG 102 is the destination, process the frame.

Similarly, when the WAG 102 needs to send data or signaling to the UE 100, the WAG 102 creates a TLS frame where the content (data or signaling) is encrypted (to the exception of server-hello and hello-request). The content type is indicated in the TLS header of the TLS frame. The TLS frame is then encapsulated by VLAN header or GRE header and sent over the Ethernet link to the AP 101. The AP 101 recovers the TLS type Ethernet frame from the VLAN or GRE header or the like and sends over the WiFi L2 link as an 802.11 MAC frame to the UE 100. The UE 100 receiving the 802.11 MAC frame, determines the Ethernet frame is a TLS frame, decrypts the TLS content is encrypted and processes the content. Examples of TLS content processing done at the UE 100 include:

1. If content is IP traffic/packets, send the payload to the upper IP layers of the UE 100 (note that IP traffic may include TLS over TCP/IP traffic if the UE 100 attempts to access a secure web site via the public WLAN, in which case, according to embodiments of this specification, the public WLAN used by the UE 100 would independently provide an extra layer of security using the TLS based link layer encryption that encrypts all UE traffic).
2. Authentication of the UE 100 or mutual authentication protocol processing if content corresponds to tunneled authentication.
3. Establishing the ETLS if content correspond to handshake protocol messages.
4. Establishing a PDN connection if content corresponds to WLCP messages.
5. Managing the ETLS and the ETLS session if content correspond to TLS Heartbeat or TLS Alert.
6. If content correspond to another Ethernet frame determine the next forwarding node or if WAG 102 is the destination, process the frame.

Figure 3:
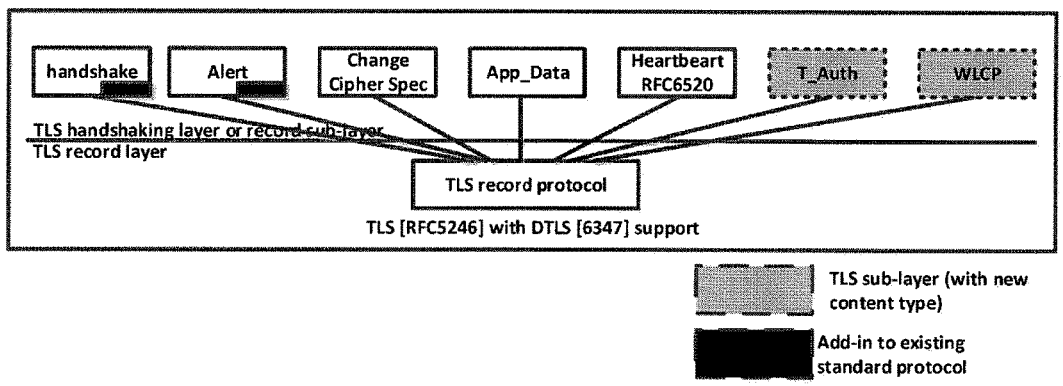
FIG. 3 illustrates TLS protocol extension according to an embodiment.

FIG. 3 illustrates the TLS protocol extension according to an embodiment. As previously described, there are currently five protocols that use the record protocol: the handshake protocol, the alert protocol, the change cipher spec protocol, and the application data protocol are specified in IETF RFC 5246 while the Heartbeat protocol is specified in IETF RFC 6520. New record content types are defined to support tunneled authentication and WLCP as previously described. The following is a proposed update to the record content types identifying the type of content encapsulated by the TLS type Ethernet frame. It is however understood that other values may be adopted to indicate tunneled authentication and WLCP:

20 change_cipher spec
21 alert
22 handshake
23 application_data
24 Heartbeat
25 Tunneled Authentication
26 WLCP The handshake protocol is updated to support ETLS capabilities negotiation during handshake of client hello and server hello messages, where the ETLS capabilities are used to negotiate the type of traffic that is encrypted by ETLS. If ETLS capability extension is omitted in the handshake protocol, the fall back would be establishment of an ETLS tunnel between the UE 100 and the WAG 102 where the WAG 102 provides direct access for the UE 100 to the internet and IP payload is transmitted encrypted within the TLS type Ethernet frame over ETLS.

When ETLS capabilities extension is negotiated and full Ethernet protection is negotiated, the TLS type Ethernet frame may encrypt the following:

1. IP payload only, i.e., IP payload previously carried by an IP type Ethernet frame or alternatively the full IP Ethernet frame carrying an IP payload.
2. Other types of Ethernet payload.

When ETLS capabilities extension is negotiated and tunnel authentication is negotiated, the UE may also include a list of preferred authentication protocols and methods to use within the extension. When the WAG sends the server Hello it indicates the selected tunnel authentication protocol and method to use for subsequent authentication over ETLS.

When WLCP is negotiated by the UE as an ETLS capability with the WAG, UE should either negotiate tunnel authentication or client authentication is performed during TLS handshake and is deemed sufficient by the operator's network to allow the UE to access EPC resources.

The Alert protocol is updated to manage the ETLS connection and session parameters. When tunneled authentication fails at the WAG 102, the WAG uses an Error Alert message to notify the UE 100 of the failed authentication. The WAG 102 may instruct the UE 100 to close the ETLS if failure is due to wrong credentials presented by the UE 100. If the failure is however due to inability of the WAG 102 to contact the AAA server 103 for authentication, the WAG 102 may restrict the UE 100 access only to the Internet (i.e., no EPC routing) until it recovers communication with the AAA server 103, at which point it informs the UE 100 to try authentication via an Alert message or another message requesting the UE 100 to re-authenticate with the WAG 102.

Additionally, the UE 100 and the WAG 102 may use closure Alert message or fatal Alert message to indicate closure or disconnection of ETLS connection without necessarily deleting the corresponding ETLS session parameters. The disconnections of ETLS may be triggered by the TLS layer itself. For example, the heartbeat protocol is used to detect the liveness of the ETLS path, and ETLS is assumed to be disconnected when unreachability by either ETLS end-points (i.e., the UE 100 and the WAG 102) is detected. The disconnections of ETLS may be triggered by other events not related to the TLS layer such as disassociation of the UE 100 from the AP 101. Although ETLS is closed, the ETLS session may not be deleted as a result. The ETLS session may resume when the conditions allow the UE 100 to reinitiate setup of ETLS using the same session ID. When resuming an ETLS session. The UE 100 does not use the full handshake and certificate authentication procedure. Instead, both the UE 100 and the WAG 102 exchange ChangeCipherSpec messages and proceed directly to Finished messages to establish ETLS. Any previously negotiated ETLS capabilities do not need to be renegotiated as the ETLS capabilities are maintained as part of the session parameters.

Furthermore, when the UE is connected to the EPC via WLCP procedure, and the UE 100 is later on detached, the alert message can be used to notify the WAG 102 of the UE 100 detach from the EPC. Note that WLCP is used to notify PDN disconnection. However, a PDN disconnection is not necessarily equivalent to an EPC detach by the UE 100.

Figure 4A:
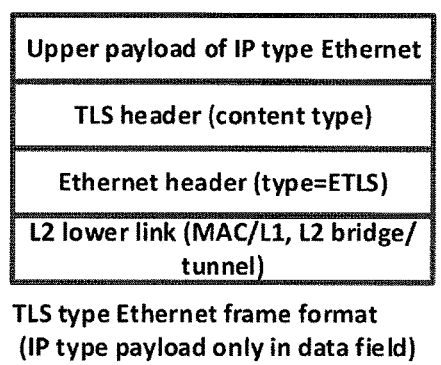
FIGS. 4a and 4b illustrates two TLS type Ethernet frames format according to two embodiments.
Figure 4B:
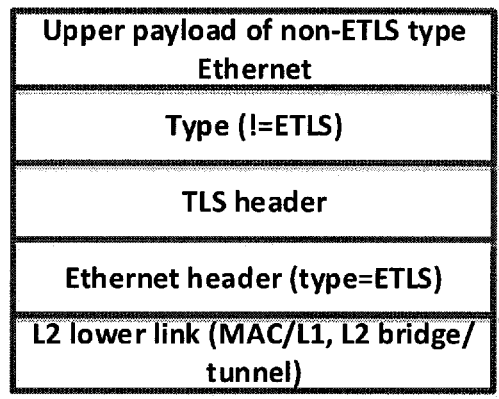

FIGS. 4a and 4b illustrates two embodiments of the TLS type Ethernet frame. FIG. 4a illustrates a simple TLS type frame that encapsulates native IP payload (i.e., not encapsulated in the well-known IP type Ethernet frame). That frame can be used as a default frame or as a frame used when ETLS capabilities are not negotiated. The TLS type Ethernet frame represented in FIG. 4a will be used instead of the legacy IP type Ethernet type frame to transport the IP payload. The content type in the TLS header of the TLS frame reuse application_data value to indicate IP payload. If, however, ETLS capabilities are negotiated and full Ethernet protection capability is negotiated, the TLS type Ethernet frame illustrated in FIG. 4b could instead be used. The TLS type Ethernet frame of FIG. 4b includes an Ethernet type field following the TLS header to identify the type of Ethernet frame that is encrypted to facilitate extraction and parsing of the frame for further processing by the WAG 102. The Ethernet type can be any Ethernet type other than TLS type Ethernet type (Ethernet type=!ETLS). The TLS content type can be set to indicate application_data as the additional Ethernet type field appended to the TLS header is used to further indicate the type of frame. In an alternative embodiment to FIG. 4b, a new value for the content type carried in the TLS header could be used to indicate "Ethernet frame" being encapsulated as payload instead of using "application data". In this case, the additional Ethernet type field (2 bytes) following the TLS header may not be necessary as the WAG 102 would be able to parse the frame and determine the type of Ethernet frame that is encapsulated once decrypted. It is understood that FIG. 4a and FIG. 4b are provided as examples, but different formats of the TLS type Ethernet frame could be used to identify the type of payload to allow determination of the processing required.

Figure 5:
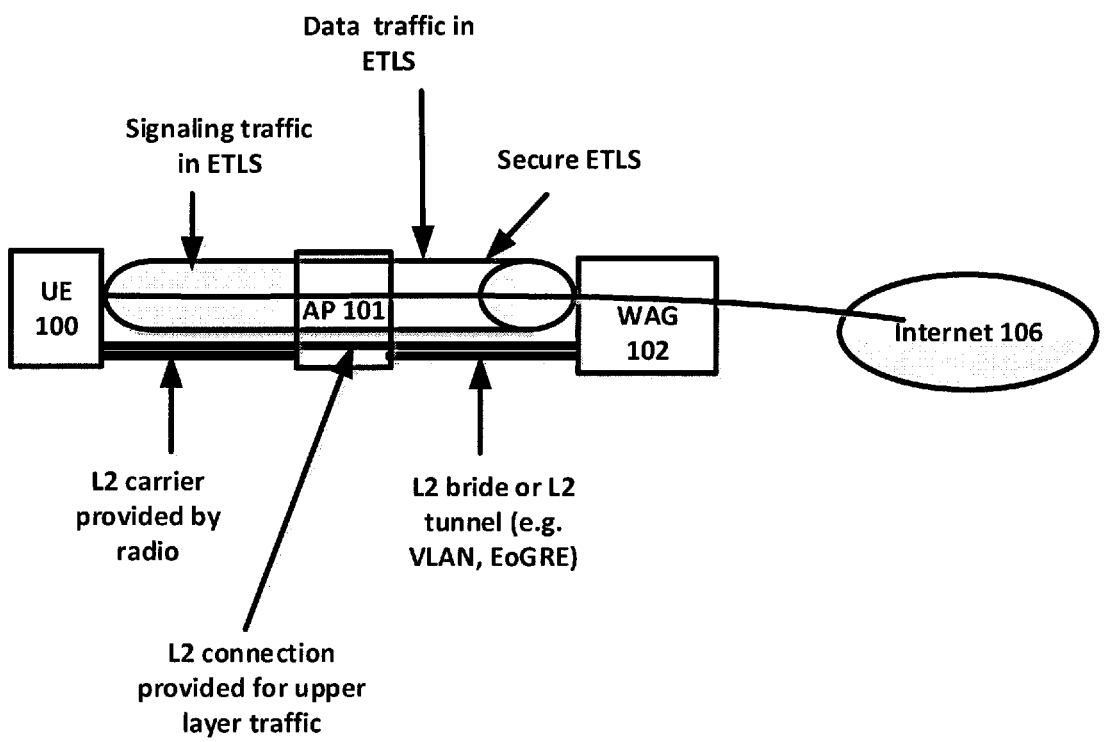
FIG. 5 illustrates local offloading of traffic to the Internet using ETLS according to an embodiment.

FIG. 5 and FIG. 6 illustrate NSWO according to an embodiment and the EPC routing according to another embodiment. As explained above, if the UE has not negotiated WLCP following establishment of ETLS, the UE 100 is provided NSWO access to the Internet 106, i.e., local offloading to the internet from the WAG 102 bypassing the EPC resources. In this configuration, all IP payload is encrypted over the ETLS and transmitted over the P2P L2 link in TLS type Ethernet frames between the UE 100 and the WAG 102. Furthermore, TLS signalling for ETLS management is transported over the established ETLS.

If at TLS handshake, the UE 100 successfully negotiated WLCP capability, it should also have negotiated tunneled authentication capability. Tunneled authentication may be required if client certificate authentication has not been performed at handshake or if stronger authentication is required by the operator's network. Once ETLS is established between the UE 100 and the WAG 102 using the embodiment illustrated in FIG. 1, and both tunneled authentication and WLCP were negotiated, the UE 100 initiates authentication over the ETLS with the WAG 102 and the AAA server 103. Either EAP-AKA' exchange tunneled over ETLS or tunnel AVP authentication in accordance with EAP-TTLS can be used to authenticate the UE 100 and optionally the WAG 102 if mutual authentication scheme is selected. All authentication messages are sent natively and encrypted in TLS type Ethernet frame without the need for the UE 100 to establish an IP layer. A new TLS content type or record content type indicating tunneled authentication is used to indicate that the encrypted TLS payload corresponds to tunneled authentication messages. Once authentication is completed successfully by the AAA server 103, the WAG 102 notifies the UE 100 in accordance with the used authentication protocol. Subsequently, as shown in FIG. 6, the UE 100 initiates WLCP to establish a PDN connection with the PGW 104 in the EPC. WLCP messages are sent encrypted in the TLS type Ethernet frame over ETLS. A new TLS content type is defined to identify that the encrypted payload corresponds to WLCP messages. Once the PDN connection is established using the WLCP protocol specified in 3GPP TS 24.244, the user data transported over the PDN connection is encrypted by the TLS record layer and identified as application_data by the content type field in the TLS header. Note that unlike WLCP protocol specified in 3GPP TS 24.244 that requires UDP/IP protocol, the WLCP supported over ETLS run natively and encrypted in a layer 2 TLS type Ethernet frame. If the UE 100 in FIG. 6 wishes to establish multiple PDN connections, then all PDN connections established by the UE 100 using WLCP share the same UE MAC address but different WAG virtual MAC address in the TLS type Ethernet frame. That is, although encrypted user traffic from each PDN connection share the same ETLS, traffic from different PDN connection may have different TLS type Ethernet frame capsulation. This would allow the UE 100 and the WAG 102 to differentiate the traffic from the different PDN connections sharing the ETLS.

Figure 7:
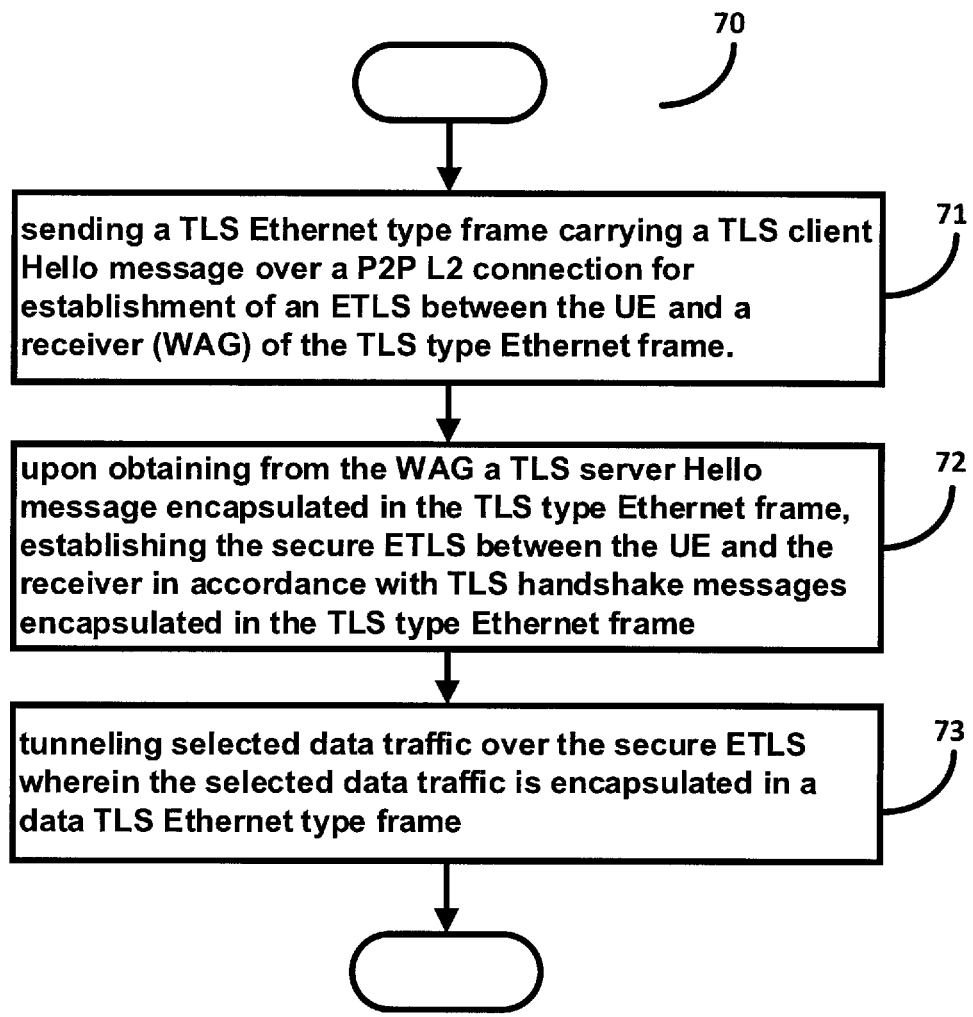
FIG. 7 illustrates a method for establishing an ETLS using TLS type Ethernet frame according to an embodiment

FIG. 7 illustrates a method 70 executed at a UE for establishing an ETLS with a WAG over a P2P L2 link according to one embodiment. The UE supporting ETLS has a TLS client associated with layer 2 protocol of the UE enabling the UE to establish a TLS tunnel for link layer encryption over the public WLAN. The UE at step 71 starts communicating with the WAG by initiating the TLS handshake protocol and sending a client hello message unencrypted in a TLS type Ethernet frame which is then transmitted over the P2P L2 link connecting the UE to the WAG through an AP. The UE may trigger the client hello if 1. it receives a server hello request in a TLS type Ethernet frame requesting establishment of ETLS, or
2. the UE receives data to send to the WAG from its upper layer protocols, such as DHCP message to be sent by the UE to acquire an IP address from the WLAN.

Additionally, the UE may include in the client hello message the client certificate if one was obtained or configured by the UE's operator. Client certificate may be an ITU X.509 public key certificate or other type of certificate issued by a trusted authority.

The UE may also include in the client hello message the ETLS capabilities extension to negotiate tunneled authentication, WLCP and/or full Ethernet protection as previously described. At step 72, when the UE obtains from the WAG a TLS server Hello message encapsulated and unencrypted in the TLS type Ethernet frame, it may include a request for client certificate if one was not included in client hello message at step 71. The UE proceeds with the handshake protocol to establish the secure ETLS with the WAG. The remaining handshake procedure is in accordance with TLS handshake messages described in IETF RFC 5246 and include UE initiated client key exchange which may include the client certificate, UE initiated client finish encrypted by the generated shared secret and reception of server finish message encrypted by the shared keys generated by the server, i.e., the WAG marking the end of the handshake and establishment of the ETLS (also referred to as secure ETLS). The UE at step 73, starts tunneling selected data traffic over the secure ETLS wherein the selected data traffic is in accordance with the negotiation of the full Ethernet encryption in the ETLS capabilities. If full Ethernet encryption is negotiated, the UE may encrypt in addition to native IP payload other Ethernet frames that are not IP type and TLS type Ethernet frames. Alternatively, the UE may send all Ethernet frames including the IP type Ethernet frames as encapsulated frames encrypted within the TLS type Ethernet frame. In the absence of full Ethernet encryption negotiation, the UE encrypts native IP payload in TLS type Ethernet frames for transmission over the ETLS and IP type Ethernet frames are replaced by TLS type Ethernet frames. In this specification, data TLS type Ethernet frame is sometimes used to refer to a TLS type Ethernet frame that carries encrypted payload. The format of TLS type Ethernet frame and data type Ethernet frame is the same. The difference is whether the frame carries encrypted payload or unencrypted payload such as client hello, server hello and hello request. The type of payload is identified by the content type. For simplicity, most of the embodiments are described using the terminology TLS type Ethernet frame to refer to all the TLS type frames as the majority of TLS traffic is encrypted to the exception of the three TLS messages used in the initial establishment of the ETLS mentioned above. The following table identifies the content type of a TLS frame and whether it is encrypted:

| Data/signaling content description | Content type | encryption |
|---|---|---|
| Client/server Hello and Hello request | Handshake | No (TLS type Ethernet with no encryption) |
| Finish | Handshake | Yes (TLS type Ethernet a data TLS type Ethernet frame) |
| Change_cipher spec | Change cipher spec | Yes (TLS type Ethernet frame is a data TLS type Ethernet frame) |
| TLS Alert | Alert | Yes (TLS type Ethernet is a Data TLS type Ethernet) |
| TLS Hearbeat | Heartbeat | Yes (TLS type Ethernet is a Data TLS type Ethernet) |
| WLCP | WLCP | Yes (TLS type Ethernet is a Data TLS type Ethernet) |
| Tunneled authentication | Tunneled Authenticatino | Yes (TLS type Ethernet is a Data TLS type Ethernet) |
| IP packets | Application_data | Yes (TLS type Ethernet is a Data TLS type Ethernet) |
| Ethernet frames | Application_data (or Ethernet data) | Yes (TLS type Ethernet is a Data TLS type Ethernet) |

If UE successfully negotiated tunneled authentication and WLCP capabilities extension for access to EPC resources and services, corresponding signaling is sent by the UE over the ETLS encapsulated in TLS type Ethernet frames. The UE may negotiate tunneled authentication to access EPC resources and services if it is not configured with client certificate or if it is configured to perform a different authentication other than client certificate authentication. If the UE negotiated tunneled authentication capability extension in the client hello message, the extension also indicates the order of preference of the authentication protocol and method to use to authenticate the UE by the WAG and optionally authentication of the WAG by the UE. When the UE receives server hello message from the WAG, it includes the selected authentication protocol and method in the tunneled authentication capability extension. Once the handshake is completed and the ETLS is established, the UE initiates authentication protocol according to the negotiated capability. All the authentication messages are sent encrypted in TLS type Ethernet frames with content type indicating tunneled authentication.

In one embodiment, the UE negotiates in the ETLS capabilities extension the use of WLCP to manage PDN connections to the EPC resources and services over the established ETLS. Use of WLCP is successfully negotiated if client authentication is either negotiated via tunneled authentication capability extension or client certificate authentication is performed during handshake and it is deemed sufficient by the operator's EPC. Once the ETLS is established the UE initiates WLCP procedure to establish one or more PDN connections. The UE sends and receives encrypted WLCP messages natively as TLS payload over Ethernet. The TLS record content type is updated to indicate WLCP traffic as payload.

To manage the ETLS connection/tunnel and session, the UE sends Alert message to indicate release of the ETLS by the UE or it receives an Alert message from the WAG to indicate release of the ETLS due to reasons such as authentication failure. Additionally, if the UE is detached, the UE may send an Alert message to indicate that the UE is detached. When the UE releases the ETLS connection, it may maintain the ETLS session parameters for a determined amount of time during which it may re-establish the ETLS connection/tunnel using the same session parameters. When the UE reuses the stored session parameters to re-establish the ETLS connection, the UE does not need to send client hello or renegotiate any ETLS capability extensions. Instead the UE proceeds by exchanging TLS ChangeCipherSpec messages specified in the TLS handshake protocol of IETF RFC 5246 and proceeds directly to sending Finished messages after which the ETLS is re-established. The ChangeCipherSpec and Finished messages are sent encrypted within TLS type Ethernet frames using the cryptographic parameters stored in the session parameters.

Figure 8:
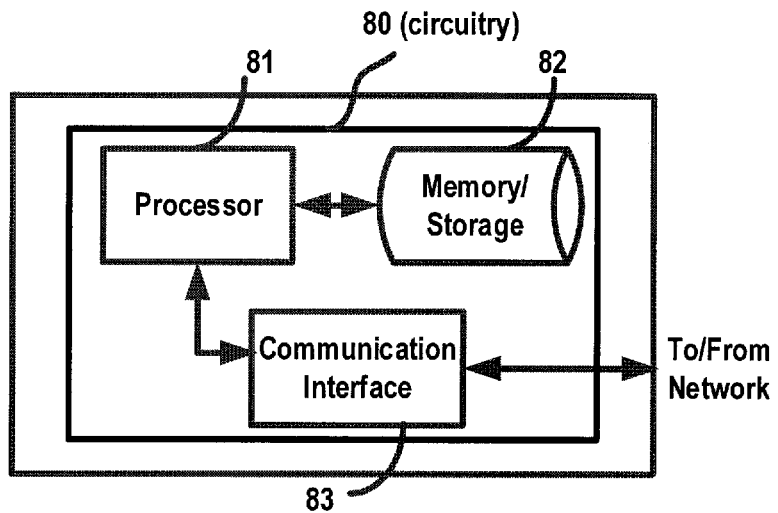
FIG. 8 illustrates a schematic illustration of a device such as UE, according to an embodiment.

In one embodiment illustrated in FIG. 8, a UE 100 comprises a circuitry 80 which executes the method steps according to the embodiments as described in FIG. 7, along with steps 120, 123, 124, 127, 130 and 131 of FIG. 1 in addition to other embodiments described herein. In one embodiment, the circuitry 80 may comprise a processor 81 and a storage 82 (also referred to as memory) containing instructions, which when executed, cause the processor 80 to perform the steps in a method according to embodiments described herein. The circuitry 80 may further comprise a communication interface 83 to communicate through an AP with a WAG 102 using ETLS over the P2P L2 link.

Figure 9:
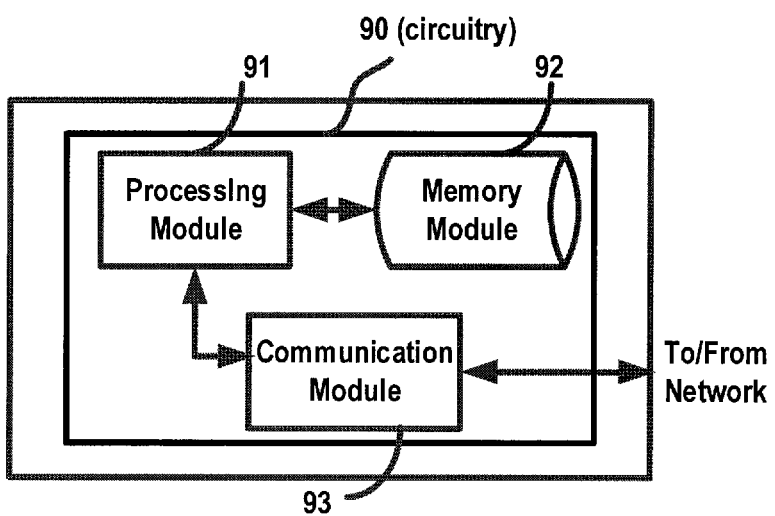
FIG. 9 illustrates a schematic illustration of a device such as UE, according to another embodiment.

FIG. 9 illustrates an embodiment of a UE 100 comprising a processing module 91 configured to send over a communication module 93 a TLS type Ethernet frame carrying a TLS client Hello message over the P2P L2 link for establishment of the ETLS between the UE and a WAG in the network acting as the receiver of the TLS type Ethernet frame. Upon receipt of a TLS server Hello message over the communication module 93 from the receiver and where the TLS server hello is encapsulated in the TLS type Ethernet frame, the processing module 91 establishes over the communication module 93 the secure ETLS between the UE and the receiver in accordance with the TLS handshake messages specified in IETF RFC 5246. The handshake messages are encapsulated in the TLS type Ethernet frame by the processing module 91. The processing module 91 tunnels over the communication module 93 selected data traffic over the secure ETLS wherein the selected data traffic is encrypted and encapsulated in the TLS type Ethernet frame.

Additionally, the communication module 93 is configured to send and receive TLS messages encapsulated in a TLS type Ethernet frame and send and receive the selected data traffic encapsulated in the TLS type Ethernet frame. The processing module 91 is further configured to store in the memory module 92 the session parameters associated with the establishment of the secure ETLS. The memory module (92) maintains the session parameters until the ETLS session is released in which case the processor module (91) requests deletion of the session parameters from the memory module (92).

A person skilled in the art would understand that the modules in the UE 100 can be implemented as a computer program running on a processor and that the modules are operative to execute the steps of the previously described embodiments.

Those skilled in the art will recognize improvements and modifications to the embodiments of the present disclosure. All such improvements and modifications are considered within the scope of the concepts disclosed herein and the claims that follow.

What is claimed is:

1. A device comprising:
a processor configured to:
send over a communication interface a transport layer security (TLS) type Ethernet frame carrying a TLS client Hello message over a link layer connection for establishment of a secure TLS tunnel over Ethernet (ETLS) between the device and a receiver of the TLS type Ethernet frame;
upon receipt over the communication interface from the receiver of a TLS server Hello message encapsulated in the TLS type Ethernet frame, establish over the communication interface the secure ETLS between the device and the receiver in accordance with TLS handshake messages encapsulated in the TLS type Ethernet frame;
tunnel over the communication interface selected data traffic and signaling over the secure ETLS, wherein the selected data traffic is encrypted and encapsulated in a data TLS type Ethernet frame;
store in the memory session parameters associated with the secure ETLS;
the communication interface configured to:
send and receive TLS signaling messages encapsulated in at least one of the TLS type Ethernet frame or the data TLS type Ethernet frame;
send and receive the selected data traffic and signaling encapsulated in the data TLS type Ethernet frame; and
the memory configured to:
maintain session parameters associated with establishment of the secure ETLS.

2. A device configured to establish a secure link layer connection over a wireless area network (WLAN), the device comprises a circuitry configured to:
send a transport layer security (TLS) type Ethernet frame carrying a TLS client Hello message over a link layer connection for establishment of a secure TLS tunnel over Ethernet (ETLS) between the device and a receiver of the TLS type Ethernet frame;
upon receipt from the receiver of a TLS server Hello message encapsulated in the TLS type Ethernet frame, establish the secure ETLS between the device and the receiver in accordance with TLS handshake messages encapsulated in the TLS type Ethernet frame; and
tunnel selected data traffic and signaling over the secure ETLS wherein the selected data traffic is encrypted and encapsulated in a data TLS type Ethernet frame.

3. The device of claim 2, wherein the circuitry is further configured to negotiate during establishment of the secure ETLS, ETLS capabilities extension to indicate one or more type of the selected data traffic to encapsulate within the data TLS type Ethernet frame.

4. The device of claim 3, wherein the ETLS capabilities extension indicates the circuitry is further configured to encapsulate one or more Ethernet frame of a different type within the data TLS type Ethernet frame.

5. The device of claim 3, wherein the ETLS capabilities extension comprises tunneling authentication protocol to authenticate access for the device to a packet core network over the established secure ETLS.

6. The device of claim 5, wherein the authentication protocol tunneled over the ETLS corresponds to an Extended Authentication Protocol (EAP).

7. The device of claim 5, wherein the ETLS capabilities extension further comprises tunneling WLAN access control protocol (WLCP) over the established secure ETLS, and wherein the WLCP is used to manage establishment and release of packet data connection to the packet core network over the established secure ETLS.

8. The device of claim 7, wherein initiation of the WLCP is conditional to successful outcome of the authentication to the packet core network in accordance with the authentication protocol.

9. The device of claim 7, wherein the circuitry is further configured to send over the secure ETLS a TLS Alert message to indicate detach of the device from the packet core network.

10. The device of claim 5, wherein the circuitry is further configured to receive over the secure ETLS a TLS Alert message to indicate authentication failure.

11. The device of claim 2, wherein the circuitry comprises a processor, a communication interface, and a memory, the memory containing instructions executable by the processor.

12. The device of claim 2, wherein the circuitry is further configured to send the TLS type Ethernet frame carrying the TLS client Hello message at reception of at least one of TLS type Ethernet frame carrying a server hello request message from the receiver or of data to send from upper protocol layers of the device.

13. The device of claim 2, wherein the circuitry is further configured to send a TLS Alert message to indicate release of the secure ETLS.

14. The device of claim 2, wherein the selected data traffic and signaling corresponds to native internet protocol (IP) traffic.

15. A method for establishing a secure link over a wireless area network (WLAN), the method executed at a user equipment (UE), the method comprising:

sending a transport layer security (TLS) type Ethernet frame carrying a TLS client Hello message over a link layer connection for establishment of a secure TLS tunnel over Ethernet (ETLS) between the UE and a receiver of the TLS type Ethernet frame;

upon obtaining from the receiver a TLS server Hello message encapsulated in the TLS type Ethernet frame, establishing the secure ETLS between the UE and the receiver in accordance with TLS handshake messages encapsulated in the TLS type Ethernet frame; and tunneling selected data traffic and signaling over the secure ETLS, wherein the selected data traffic is encrypted and encapsulated in a data TLS type Ethernet frame.

16. The method of claim 15, wherein the method further comprises the UE and the receiver negotiating ETLS capabilities extension, and wherein the ETLS capabilities extension indicates one or more type of the selected data traffic and signaling to encapsulate within the data TLS type Ethernet frame.

17. The method of claim 16, wherein the ETLS capabilities extension indicates encapsulating within the data TLS type Ethernet frame one or more Ethernet frame of a different type.

18. The method of claim 16, wherein the ETLS capabilities extension further indicates support for tunneling an authentication protocol for authenticating access for the UE to a packet core network over the established secure ETLS.

19. The method of claim 18, wherein the authentication protocol tunneled over the ETLS corresponds to an Extended authentication protocol (EAP).

20. The method of claim 18, wherein the ETLS capabilities extension further indicates support for tunneling WLAN access control protocol (WLCP) over the established secure ETLS, and wherein the WLCP is used to manage establishment and release of packet data connection to the packet core network over the established secure ETLS.

21. The method of claim 20, wherein initiation of the WLCP is conditional to successful outcome of authenticating access for the UE to the packet core network in accordance with the authentication protocol.

22. The method of claim 20, wherein the method further comprises sending a TLS Alert message to indicate detach of the UE from the packet core network over the secure ETLS.

23. The method of claim 18, wherein the method further comprises receiving a TLS Alert message to indicate access authentication failure over the secure ETLS.

24. The method of claim 15, wherein the method further comprises sending a TLS Alert message to indicate release of the secure ETLS.

25. The method of claim 15, wherein the step of sending the TLS type Ethernet frame carrying the TLS client Hello message is triggered by reception of at least one of a TLS type Ethernet frame carrying a server hello request message from the receiver, or reception of data to send over the link layer connection from upper protocol layers of the UE.

26. The method of claim 15, wherein the step of tunneling selected data traffic and signaling indicate encapsulating within the data TLS type Ethernet frame native internet protocol (IP) traffic between the UE and the receiver.

27. A non-transitory computer-readable storage medium, having stored thereon a computer program, comprising instructions which, when executed on at least one processor, cause the at least one processor to carry out the method according to claim 15.

* * * * *